United States Patent [19]
Guilford

[11] Patent Number: 5,371,765
[45] Date of Patent: Dec. 6, 1994

[54] BINARY PHASE ACCUMULATOR FOR DECIMAL FREQUENCY SYNTHESIS

[75] Inventor: John H. Guilford, Everett, Wash.

[73] Assignee: Hewlett-Packard Company, Palo Alto, Calif.

[21] Appl. No.: 911,847

[22] Filed: Jul. 10, 1992

[51] Int. Cl.$^5$ .............................................. H03D 3/24
[52] U.S. Cl. ...................................... 375/119; 331/34; 364/762; 455/260; 327/107
[58] Field of Search ...................... 375/118, 119, 120; 364/724.13, 762, 778, 780, 784; 331/15, 16, 18, 34; 328/14, 15; 455/260; 307/529

[56] References Cited

U.S. PATENT DOCUMENTS

| | | | |
|---|---|---|---|
| 4,816,774 | 3/1989 | Martin | 331/16 |
| 4,951,004 | 8/1990 | Sheffer et al. | 331/1 A |
| 4,984,186 | 1/1991 | Maerder | 328/14 |
| 4,992,743 | 2/1991 | Sheffer | 328/14 |
| 5,010,506 | 4/1991 | Hrncirik | 364/721 |
| 5,034,977 | 7/1991 | Chen et al. | 328/14 |

OTHER PUBLICATIONS

Hewlett-Packard Journal, Feb. 1989, "A Generating a Phase-Locked Binary Reference Freguency", p. 68.
Microwaves & RF, Sep. 1991, "Fast Synthesizer." Portion of an artical addressed by the invention, and presuming it would be solver"eventually" by fast versions of the old BCD accumulator technique. p. 122.

*Primary Examiner*—Stephen Chin
*Assistant Examiner*—Amanda T. Le

[57] ABSTRACT

A direct digital synthesizer of the phase-accumulator type, constructed entirely of binary-radix digital hardware, generates signals with decimally-defined frequency resolution. The synthesizer is supplied with a clock signal which is also decimally-defined. The usual decimal-binary incompatibility problems of such a combination are overcome by the use of a phase accumulator which is partitioned into two segments. The first segment is assigned the most significant portion of the desired frequency, and the other segment is assigned the remaining portion of the desired frequency. The two segments have different arithmetic moduli. Typically, the modulus of the first segment is a power of two, while that of the second segment is an integer other than a power of two. A procedure is given for determining both the point of partition and the second arithmetic modulus.

8 Claims, 3 Drawing Sheets

BINARY PHASE ACCUMULATOR FOR DECIMAL FREQUENCY SYNTHESIS

FIELD OF THE INVENTION

The invention relates to frequency synthesis, and especially to Direct Digital Synthesis, the technique of generating signals by computing numerical samples of a desired waveform. In particular, this invention relates to the use of binary hardware elements, governed by a decimally-defined clock, to compute samples of waveforms having decimally-defined frequency resolution.

BACKGROUND OF INVENTION AND RELATED ART

It is commonplace in the sciences to require the generation of an electrical signal having certain specified characteristics, among them frequency, amplitude, and waveshape. Frequency synthesis is a broad term for the art of generating a signal whose frequency is a rational number times the frequency of an available reference or clock source. This number can be varied by a user to produce many choices of the frequency of the generated signal. The resolution of a frequency synthesizer refers to the minimum frequency difference between allowable choices.

Common techniques established in the synthesis art include a) direct synthesis: combining various harmonics and subharmonics of the reference source;

b) indirect synthesis: using a phase lock loop to regulate a tunable oscillator to a harmonic of the reference;

c) direct digital synthesis (DDS): using a reference clock to govern the periodic computing of samples of a chosen signal. When an analog signal is wanted, a D/A converter is used to transform the samples.

DDS is a straightforward concept: at regular time intervals, digital computing apparatus computes the phase of a desired signal. That is, it computes discrete samples of the continually increasing phase $2\pi ft$ of a signal of frequency f. Then, for each phase sample, it computes the corresponding magnitude of the signal. The relationship between phase and magnitude is commonly sinusoidal, but many others (e.g., triangular) are possible. General-purpose computational hardware, such as a microprocessor, can be used to compute the desired signal samples. The usual practice, however, is to use specialized hardware called a "phase accumulator" in order to gain speed and efficiency.

A typical phase accumulator circuit is seen in FIG. 1. When a clock signal $f_c$ is applied, an adder 11 adds a constant number K to the contents of an accumulator register 12 and saves the sum in register 12. The sequence of numbers stored in register 12 corresponds to successive samples of the phase $2\pi ft$ of a desired signal; the additive constant K, called the phase increment, represents the frequency of the signal. Of course, adder 11 has a finite capacity and it overflows when this is reached. But this limitation is conveniently accomodated by the fact that the desired sinusoidal signal is periodic: the phase argument $2\pi ft$ of the sine function is equally valid when replaced by $2\pi ft$ modulo $2\pi$. Thus, the number causing overflow of adder 11—its arithmetic modulus—corresponds to $2\pi$ radians; that is, one cycle of phase.

If $f_c$ is the clock frequency, K is the phase increment, and D is the arithmetic modulus of the adder, then the circuit of FIG. 1 generates samples of a signal of frequency f, given by $$f = f_c \cdot \frac{K}{D} \quad (1)$$

There is a difficulty in the practical implementation of DDS which derives from the following considerations. Users customarily want to specify the resolution of the frequency f (the minimum difference between choices of f) as a "decimally-defined" number, a term used in this disclosure to denote a number composed of a power of ten times a (relatively) small integer. Likewise, the clock frequency, $f_c$, is customarily a decimally-defined number. Yet D, the modulus of the adder 11, is usually a power of two, because it is desirable to use binary hardware for registers, adders, and other components for reasons of speed and efficiency. These practical choices lead to a problem of numerical incompatibility, as this example shows:

Let $f_c = 1$ MHz and $D = 2^{16}$. Then the synthesized frequency f will be a multiple of $10^6/2^{16} = 15.268+$ Hz. This number is also the resolution and is decidedly not decimally-defined.

The problem of numerical incompatibility among the components of Eq. 1, and some prior efforts to solve it, are discussed more fully in U.S. Pat. No. 4,951,004 issued Aug. 21, 1990 to Sheffer et al. Sheffer also discloses an effective solution to this problem. A nearly identical solution is presented in the Hewlett-Packard Journal of February, 1989, page 68. Both teach how to synthesize, from an available decimally-defined reference, an appropriate clock frequency $f_c$ having sufficient binary factors to cancel those in D, while providing for the desired decimal resolution of f.

Nevertheless, there are difficulties with these solutions. The most obvious is the need for a phase locked loop to synthesize $f_c$. Building this partially analog circuit requires components which are difficult to include in a large-scale integrated circuit whose other components are digital. In addition, the user may want to change the resolution, requiring a change in $f_c$. This may mean reconfiguring the loop filter and waiting for the loop to settle.

Another potential problem is that, depending on the choice of the reference frequency and the desired resolution, the required $f_c$ may be uncomfortably high for operating the DDS hardware. In addition, when $f_c$ is different from the main system reference frequency, spurious signals may appear in the desired output, as the Hewlett-Packard reference illustrates.

There remains, therefore, a need to solve the problem of numerical incompatibility using only integratable digital hardware operating at a decimally-defined clock frequency.

SUMMARY OF THE INVENTION

The abovementioned problems, along with others, are overcome in u the preferred embodiment of the invention through using a unique form and combination of the synthesis circuit known in the art as a phase accumulator. The illustrated hardware realization of the invention is binary throughout: all the circuit elements and the arithmetic functions that they realize are binary. Yet both the resolution of the synthesized frequency and the supplied reference clock signal are decimally-defined.

One aspect of the preferred embodiment of the invention combines two binary phase accumulator circuits to form what is, in effect, a single phase accumulator partitioned into two segments. One of these segments is responsible for computing the most significant portion (i.e., the high order bits) of the number representing the phase of the desired signal. Its arithmetic modulus N is the binary number $2^p$, where p is the size of the segment in bits. The other segment computes the least significant portion of the phase number. The size of this segment is q bits, but its arithmetic modulus is not the expected binary number $2^q$ but an arbitrary, smaller, non-binary integer S. Although the choice of S is arbitrary, its value is significant: it may be chosen such that the binary-decimal incompatibility problem is overcome. The point of partition, which determines the values of p and q, is dictated by external design requirements.

In another aspect of the preferred form of the invention, a method is detailed for choosing the values of S, the arithmetic modulus and $\delta$, the smallest value of the phase increment, in order to meet the design requirements.

LIST OF DRAWINGS

DETAILED DESCRIPTION

Phase accumulator. As there is a strong relationship between the illustrated embodiment of the invention and a phase accumulator circuit of the prior art, as shown in FIG. 1, it will be useful to review briefly the operation of such a phase accumulator.

Figure 1:
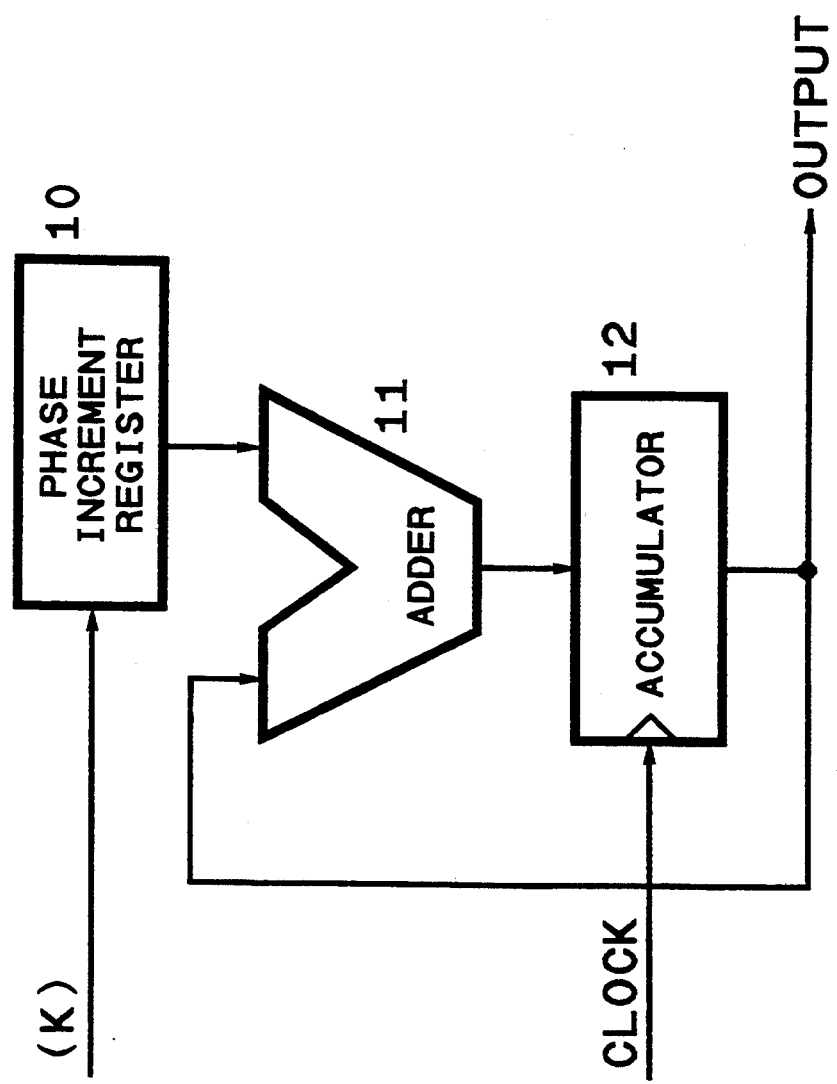
FIG. 1 is a phase accumulator synthesizer from prior art.

FIG. 1 shows two digital storage registers 10 and 12 and a digital adder 11. For simplicity, assume these devices are designed for binary arithmetic operations, rather than binary-coded-decimal or other digital format; the principle of operation remains the same for all. Registers 10 and 12 each function in this manner: an ordered binary word is furnished as an input (shown at the top) of the register. When a clock signal is applied, the input word is accepted into internal storage, and, at the same time, a buffered version of the word is made available at the output (shown at the bottom). The clock input of register 10 is not illustrated; in this application, its contents change infrequently.

Adder 11 is a collection of one-bit, full binary adder cells. There are at least as many of these cells as the number of bits in register 12. Each cell has two addend inputs, a sum output, and both a carry input and a carry output. The carry interconnections determine the order of the cells: each cell receives, as a carry input, the carry output from the cell one bit less significant in the word.

With the three devices 10, 11, and 12 connected as shown in FIG. 1, the application of a clock pulse to register 12 causes the new contents of register 12 to become the sum of its previous contents and the word stored in register 10. The contents of register 12 thus grow, or accumulate, at a rate determined by both the size of the word in register 10 and the clock rate. The sequence of successively larger numbers represents the phase of the signal being synthesized.

Figure 2:
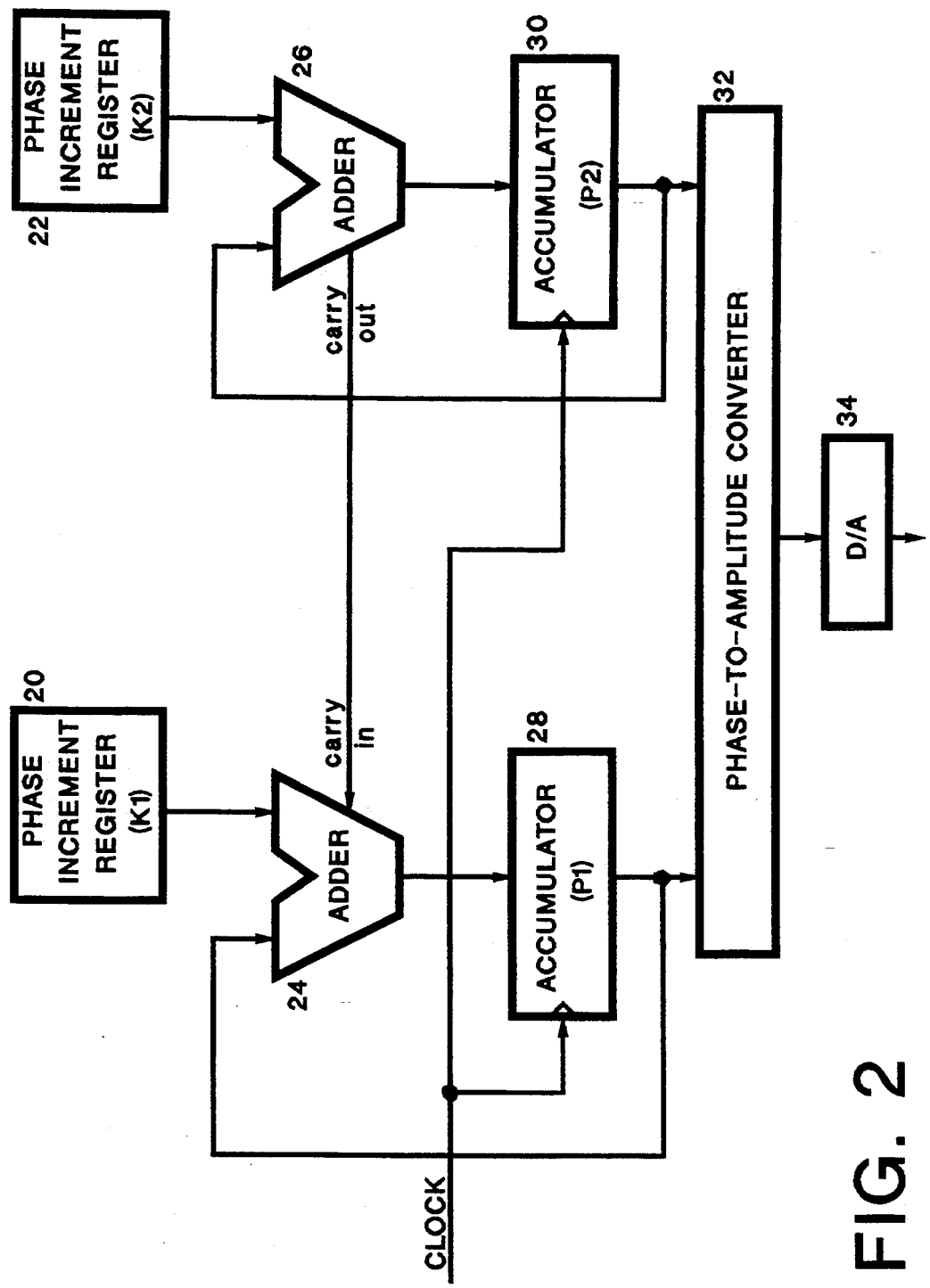
FIG. 2 is a circuit diagram of a partitioned phase accumulator useful in the preferred embodiment of the invention.

Preferred embodiment. FIG. 2 shows a circuit representing the preferred embodiment of the invention. It is evident that there are two phase accumulators in the circuit: devices 20, 24, and 28 on the left side, and 22, 26, and 30 on the right. However, as an aid to understanding this embodiment, it is useful to regard the two phase accumulators as a single phase accumulator which has been partitioned into two segments: a most significant segment (MSS) and a least significant segment (LSS). Thus, if the MSS is p bits in size and the LSS is q bits, then the size of the number P representing the signal phase is p+q bits. The function of the carry signal between adders 26 and 24 is to link the most significant cell of adder 26 with the least significant cell of adder 24. The MSS consists of the phase increment register 20 holding a number K1, an adder 24, and an accumulator register 28. The LSS consists of a phase increment register 22 holding a number K2, an adder 26, and an accumulator register 30. A clock signal $f_c$ governs the action of both segments.

The effect of the partitioning may be understood in that K1 and K2 are the most- and least-significant components of a phase increment number K representing the frequency of a signal to be synthesized. Likewise, the p ordered bits in accumulator 28, together with the q ordered bits in accumulator 30 make up the most- and least-significant components P1 and P2, respectively, of the signal phase number P. This number grows at a rate corresponding to the phase of the synthesized signal.

The contents of each accumulator register are coupled to a phase-to-amplitude converter 32 which—in this embodiment—produces sinusoidal output samples. Because of the symmetry of the sine function, only one quadrant (90 deg.) of the function needs to be stored in a lookup table in the converter 32. The first and second most significant bits of accumulator 28 are used to inform the converter 32 which quadrant the phase is currently in, while the remaining p-2 bits are used as an argument for the lookup table. In fact, the phase synthesizer is partitioned such that p is the correct number of bits required for the operation of the lookup table within converter 32. The q bits of accumulator 30 provide the information needed for interpolation between adjacent values in the lookup table.

Inspection of FIG. 2 reveals that this circuit is more than just a partitioned binary phase accumulator. Although MSS adder 24 is a conventional binary adder with modulus $2^p$, LSS adder 26 is not conventional: it is a binary adder modified to add modulo S, where S is a non-binary integer less than $2^q$. That is, it overflows and generates a carry when the sum of its inputs reaches or exceeds S. This behavior is important in achieving the novel properties comprehended in the claims.

Analysis. The following analysis explains how this circuit achieves the objects of the invention. Later, a preferred circuit for implementing adder 26 will be presented.

The process of synthesizing decimally-defined frequencies from a decimally-defined reference may be stated succinctly by re-writing Eq. 1 as follows:

$$F \cdot f_{res} = f_c \cdot \frac{K}{D} \quad (2)$$

Here, F is an integer and $f_{res}$ is the desired decimal resolution:

$$f_{res} = 10^{-R} \text{ (R is an integer)} \quad (3)$$

The denominator D is the addition modulus of the combined phase accumulator circuit of FIG. 2. Equivalently, it is the largest number which can be contained in the combination of registers 28 and 30, plus one. D may be computed as the product of the individual moduli of the MSS and LSS:

$$D = 2^p \cdot S \quad (4)$$

The invention will function with any decimally-defined value of $f_c$; however, to simplify the presentation as well as to represent the majority of commonly used reference frequencies, $f_c$ is assumed to be composed of factors of two and five:

$$f_c = 2^a \cdot 5^b \quad (5)$$

Writing Eq. 2 with the values defined in Eqs. 3, 4, & 5:

$$F \cdot 10^{-R} = 2^a \cdot 5^b \cdot \frac{K}{2^p \cdot S} \quad (6)$$

Let $\delta$ be the integer value added to K which causes the next successive frequency to be synthesized:

$$(F + 1) \cdot 10^{-R} = 2^a \cdot 5^b \cdot \frac{(K + \delta)}{2^p \cdot S} \quad (7)$$

Subtracting (6) from (7) and re-writing $10^{-R}$ in factored form yields $$2^{-R} \cdot 5^{-R} = 2^a \cdot 5^b \cdot \frac{\delta}{2^p \cdot S} \quad (8)$$

Now, the values of R, a, b, and p are given as specifications to be met. The value of q is not critical, but it must at least equal the number of bits of K2. Thus, it remains to show that S can be chosen to realize the invention object stated earlier. The value of $\delta$ will also become evident.

An inspection of Eq. 8 indicates that it would likely be useful to choose S to be composed of twos and fives:

$$S = 2^m \cdot 5^n \quad (9)$$

Using this representation of S, and re-arranging Eq. 8, $$\delta = 2^{m+p-a-R} \cdot 5^{n-b-R} \quad (10)$$

Now, since both S and $\delta$ must be integers, this implies that, simultaneously, $$m \geq 0; \ m + p - a - R \geq 0 \quad (11) \text{ and}$$

$$n \geq 0; \ n - b - R \geq 0 \quad (12)$$

It is economical to use the smallest values of m and n which satisfy the inequalities, as these, of course, result in the smallest values of S and $\delta$. Using the values thus determined and repeatedly incrementing K by $\delta$ will synthesize signals whose frequencies are spaced by $f_{res}$. Thus, it is possible to make an appropriate choice of S to fulfill the aforementioned invention objective.

Accomodating several values of $f_c$. Although not elaborated herein, this technique is readily extendable to the case in which multiple values of $f_c$ are to be accomodated, as well as (possibly) multiple values of $f_{res}$. An effective design technique is to create a list of the factors m and n for each combination of $f_c$ and $f_{res}$. Then choosing the highest values of m and n in the list will determine a value of S and of $\delta$ to satisfy all combinations.

Design example. The following example illustrates the above procedure.

Assume these requirements for a synthesizer:
reference frequency 1 MHz
frequency resolution 0.1 Hz
8 bit, 1 quadrant phase-amplitude lookup table Translating and expanding these requirements into the terms used in this disclosure:

$$f_c = 10^6 = 2^6 \cdot 5^6 \rightarrow a = 6, b = 6$$

$$f_{res} = 10^{-1} \rightarrow R = 1$$

8 bits ROM, 2 bits for quadrant indicator $\rightarrow p = 10$

Choosing the smallest m satisfying inequalities (11):

$$m \geq 0; \ m \geq 6 + 1 - 10 \rightarrow m = 0$$

and similiarly, using (12) to determine n:

$$n \geq 0; \ n \geq 6 + 1 \rightarrow n = 7$$

Thus, from (9) and (10), $$S = 5^7; \ \delta = 2^3$$

Since $\delta$ is the value by which K must be incremented, it is helpful to write
$$K = J \cdot \delta$$

For instance, to synthesize 50 Hz requires F=500. Putting this value and the other data into Equation (6):

$$500 \cdot 10^{-1} = 2^6 \cdot 5^6 \cdot \frac{J \cdot 2^3}{2^{10} \cdot 5^7} = 10^{-1} \cdot J \quad (13)$$

which shows J=500, since 50 Hz is the 500th non-zero frequency in the range.

Figure 3:
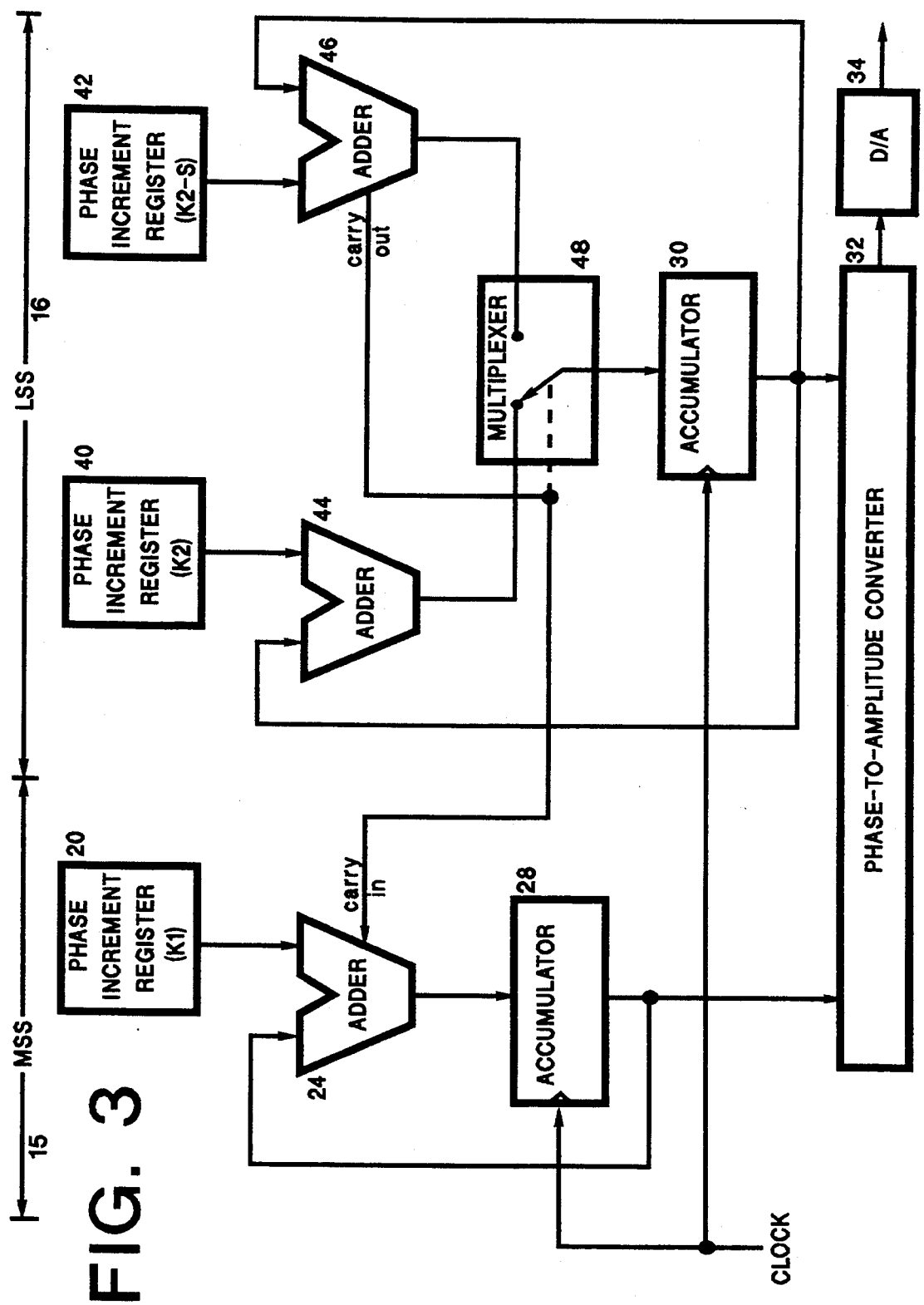
FIG. 3 is the apparatus of FIG. 2 showing details of an adder with a nonbinary modulus.

Non-binary modulus. A circuit for realizing the LSS of FIG. 2 shown in FIG. 3. In this drawing, the MSS components of FIG. 2 are repeated. In the LSS, there are now two constant registers 40 and 42, two adders 44 and 46, and a multiplexer 48 (symbolized as a switch). Adder 46 generates a carry when its sum is non-negative. Since register 42 contains the quantity K2-S (usually a large negative number), most of the time the output of adder 46 is negative, and the data flow of the LSS passes through adder 44. The function of the combination of register 42 and adder 46 is to determine the time at which the output of adder 44 will reach or exceed the value S. At this time, the output of adder 46 will be non-negative. The carry thus produced will become an input to adder 24 in the MSS and will also change the state of multiplexer 48 to steer the output of adder 46 into accumulator 30. The result of these operations is that the LSS adds modulo S.

For a numerical illustration of the operation of this circuit, assume that K2=3, S=100, and that clocking begins with the contents of accumulator 30 at zero. For the first 32 clock pulses, the output of adder 46 will be negative. On the 33rd clock pulse, accumulator 30 will contain the value 99 and the output of adder 46 will be +2, generating a carry which switches multiplexer 48 over to adder 46. This carry will also propagate into adder 24. The 34th clock pulse will latch the new value +2 into accumulator 30.

The general case. Two restrictions are contained in the above description of the preferred embodiment of the invention. The restrictions do not affect the preponderance of choices exercised by practitioners of the art, but they are theoretically unnecessary, and other embodiments of my invention may not include them. These restrictions are:

a) that $f_c$ be composed of factors of 2 and 5 (Eqn. 5)
b) that N, the modulus of the MSS, be a power of 2 ($2^p$)

For instance, $f_c$ might be 3 MHz. Likewise, it might be desirable to synthesize a waveform with ternary symmetry rather that quaternary, such as a sinusoid; that is, the same lookup table may represent three segments of a periodic waveform, rather than four. In this case, N could be $3 \cdot 2^{p-2}$.

In the general case, both $f_c$ and N may be regarded as simply integers, with no particular restrictions on their values. Thus, Eqn. 6 could be written as $$F \cdot 10^{-R} = f_c \cdot \frac{K}{N \cdot S} \quad (6a)$$

Proceding as before, Eqn. 8 thus becomes $$10^{-R} = f_c \cdot \frac{\delta}{N \cdot S} \quad (8a)$$

Again, the values of R, $f_c$, and N are design criteria, while $\delta$ and S may be chosen arbitrarily. In particular, they should be chosen to rationalize Eqn. 8a. If R is non-negative, one simple (but not necessarily optimum) choice is $\delta = N$ and $S = f_c \cdot 10^R$.

Having described and illustrated the principles of my invention with reference to a preferred embodiment, it will be apparent that the invention can be modified in arrangement and detail without departing from such principles. For example, while the invention has been described with reference to a preferred embodiment in which the addition modulus of the MSS is a power of 2, it will be recognized that in alternative embodiments this modulus could equal 3 times a power of 2 to allow for ternary, rather than quaternary, symmetry of the synthesized signal waveform.

From the foregoing, it will be recognized that the detailed embodiment is illustrative only, and should not be taken as limiting the scope of my invention. Rather, I claim as my invention all such variations as may fall within the scope and spirit of the following claims and equivalents thereto.

I claim:

1. A frequency synthesizer comprising:
   a first phase accumulator responsive to a most significant part of a phase increment input, a carry signal, and a reference signal, to generate therefrom a first accumulator output;
   a second phase accumulator responsive to a least significant part of the phase increment input and the reference signal, to generate therefrom a second accumulator output and the carry signal;
   means for producing a synthesized output signal by combining the first accumulator output as a most significant part and the second accumulator output as a least significant part;
   wherein the arithmetic modulus of the first phase accumulator is an integer power of two, and the arithmetic modulus of the second phase accumulator is other than an integer power of two.

2. A frequency synthesizer as in claim 1, wherein said means for producing comprises:
   a phase to amplitude converter, having a first digital input coupled to the first accumulator output, a second digital input coupled to the second accumulator output, and a digital output, wherein the converter determines the digital output by utilizing a predetermined rule of correspondence between phase and amplitude.

3. A frequency synthesizer as in claim 2, wherein said means for producing comprises:
   a digital to analog converter having a digital input coupled to the digital output, and an analog output as the synthesized output signal, wherein the magnitude of the analog output is a function of the digital input.

4. A synthesizer as in claim 1, the second phase accumulator further comprising:
   a first phase increment register having an input coupled to the least significant part of the phase increment input, and an output;
   a first binary adder having a first addend input coupled to the output of the first phase increment register, a second addend input, and a sum output;
   means for subtracting the arithmetic modulus of the second phase accumulator from the least significant part of the phase increment input;
   a second phase increment register having an input coupled to the subtracting means, and an output;
   a second binary adder having a first addend input coupled to the output of the second phase increment register, a second addend input, a carry output coupled to the carry input of the first phase accumulator, and a sum output;
   a multiplexer having a first input coupled to the output of the first adder, a second input coupled to the output of the second adder, a control input coupled to the carry output, and an output, wherein said multiplexer couples its first input to its output when the control input is not asserted and couples its second input to its output when the control input is asserted; and
   a binary accumulator register having an input coupled to the output of the multiplexer, a clock input coupled to the reference signal, and an output coupled to the second accumulator output, to the second addend input of the first binary adder, and to the second addend input of the second binary adder.

5. A method of synthesizing an output signal, having frequency resolution $10^{-R}$, from a reference signal of frequency $2^a \cdot 5^b$ and a phase increment number, the method comprising the steps of:
   providing a binary phase accumulator of width p+q bits;
   synchronizing the binary phase accumulator with the reference signal;
   partitioning the binary phase accumulator into a most significant phase accumulator of width p bits and a least significant phase accumulator of width q bits;

supplying a most significant portion of the phase increment number to the most significant phase accumulator;

supplying a least significant portion of the phase increment number to the least significant phase accumulator;

setting the arithmetic modulus of the most significant portion to $2^p$ and the arithmetic modulus of the least significant portion to an integer less than $2^q$; and producing the synthesized output signal by combining the output of the most significant phase accumulator together with the output of the least significant phase accumulator to form the most and least significant portions, respectively, of the output signal;

wherein R, a, b, p, and q are integers.

6. A method according to claim 4, further comprising the step of modifying the output signal by applying a predetermined rule of correspondence.

7. A method according to claim 4, further comprising the steps of:

providing a digital to analog converter; and converting the modified output signal into an analog signal using the converter.

8. In a direct digital synthesizer of the phase accumulator type supplied with a reference signal having a frequency factorable as $2^a \cdot 5^b$, a method for realizing a frequency resolution $10^{-R}$, wherein a, b, and R are integers, the method comprising the steps of:

partitioning the phase accumulator into a first phase accumulator of size p bits with addition modulus $2^p$ and a second phase accumulator of size q bits with addition modulus S;

defining a change $\delta$ in the accumulator phase increment which produces a change of $10^{-R}$ in the output frequency of the synthesizer;

choosing a value m satisfying the simultaneous inequalities $m \geq 0$ and $m+p-a-R \geq 0$;

choosing a value n satisfying the simultaneous inequalities $n \geq 0$ and $n-b-R \geq 0$;

setting the value of S to $2^m \cdot 5^n$; and setting the value of $\delta$ to $2^{m+p-a-R} \cdot 5^{n-b-r}$.

* * * * *